(12) United States Patent
Bordin et al.

(10) Patent No.: US 10,647,034 B2
(45) Date of Patent: May 12, 2020

(54) METHOD FOR APPLYING AN INSERT OF POLYMER MATERIAL ONTO A SUPPORT AND APPARATUS FOR IMPLEMENTING THIS METHOD

(71) Applicant: STEMMA SRL, Altivole (IT)

(72) Inventors: Ettore Bordin, Montebelluna (IT); Stefano Pellizzari, Montebelluna (IT)

(73) Assignee: STEMMA SRL, Cornuda (TV) (IT)

( * ) Notice: Subject to any disclaimer, the term of this patent is extended or adjusted under 35 U.S.C. 154(b) by 773 days.

(21) Appl. No.: 14/377,295

(22) PCT Filed: Feb. 7, 2013

(86) PCT No.: PCT/IB2013/051003
§ 371 (c)(1),
(2) Date: Aug. 7, 2014

(87) PCT Pub. No.: WO2013/118070
PCT Pub. Date: Aug. 15, 2013

(65) Prior Publication Data
US 2015/0008610 A1 Jan. 8, 2015

(30) Foreign Application Priority Data
Feb. 10, 2012 (IT) .............................. TV2012A0021

(51) Int. Cl.
*B29C 43/20* (2006.01)
*B29C 43/02* (2006.01)
(Continued)

(52) U.S. Cl.
CPC ........ *B29C 43/203* (2013.01); *A43B 23/0235* (2013.01); *A43B 23/0255* (2013.01);
(Continued)

(58) Field of Classification Search
CPC ..... B29C 43/203; B29C 43/18; B29C 43/021; B29C 2793/009; B29D 35/146;
(Continued)

(56) References Cited

U.S. PATENT DOCUMENTS

| 3,296,350 A | 1/1967 | Strope |
| 5,914,170 A * | 6/1999 | Rabe ...................... A47G 23/06 |
| | | 428/119 |

(Continued)

FOREIGN PATENT DOCUMENTS

| EP | 0759846 A1 | 3/1997 |
| EP | 1216807 A2 | 6/2002 |

(Continued)

OTHER PUBLICATIONS

PCT International Search Report and Written Opinion dated Jun. 6, 2013, from which the instant application is based, 10 pgs.
(Continued)

*Primary Examiner* — Robert J Grun
(74) *Attorney, Agent, or Firm* — Fredrikson & Byron, P.A.

(57) ABSTRACT

Method for applying an insert 40 of polymer material onto a support layer 30, 30a, comprising the following steps: providing a mould 10 comprising at least one base 12 and at least one cover 18; the base 12 and the cover 18 being suitable for defining with the facing surfaces 13, 17, when the mould 10 is closed, a mould impression 16 which is delimited perimetrally by a closing edge 14; spraying a polymer mixture M in the fluid state onto one of the two facing surfaces 13, 17 of the mould 10; introducing the support layer 30, 30a between base 12 and cover 18 of the mould 10 so that, when the mould 10 is closed, the support layer 30, 30a projects from the closing edge 14; pressing the cover 18 of the mould 10 onto the base 12; opening the mould 10 in order to remove the support layer 30, 30a and the associated insert 40; trimming the portion S of the polymer mixture M which, following the spraying and pressing steps, has flowed outside the external perimeter of the impression mould 16. Finally, the invention relates to a mould 10 which can be used to implement this method and the articles 20 which may be obtained by means of this method.

15 Claims, 12 Drawing Sheets

(51) Int. Cl.
  *B29D 35/14* (2010.01)
  *B29C 43/18* (2006.01)
  *A43B 23/02* (2006.01)
  *B29K 75/00* (2006.01)

(52) U.S. Cl.
  CPC ............ *B29C 43/021* (2013.01); *B29C 43/18* (2013.01); *B29D 35/146* (2013.01); *B29D 35/148* (2013.01); *B29C 2793/009* (2013.01); *B29K 2075/00* (2013.01)

(58) Field of Classification Search
  CPC .............. B29D 35/148; B29K 2075/00; A43B 23/0235; A43B 23/0255
  See application file for complete search history.

(56) References Cited

U.S. PATENT DOCUMENTS

2002/0157281 A1  10/2002  Safdeye
2013/0340214 A1* 12/2013  Terada ............... A44B 18/0049
                                                    24/444

FOREIGN PATENT DOCUMENTS

| EP | 1604795 A2 | 12/2005 |
| FR | 2454899 A1 | 11/1980 |
| JP | 6000826 A  | 1/1994  |
| JP | 6126844 A  | 5/1994  |

OTHER PUBLICATIONS

Partial Translation of European Publication No. 0759846 A1, published Mar. 5, 1997, 33 pages (1 page translation and 32 pages original publication).

"Hinterspritztechnik im Thermoplast-Spritzguss" Retrieved online from <http://www.maschinenbau-wissen.de/skript3/werkstofftechnik/kunststoffe/402-hinterspritzen> on Jul. 9, 2018, 4 pages (including 2 pages English Machine Translation).

* cited by examiner

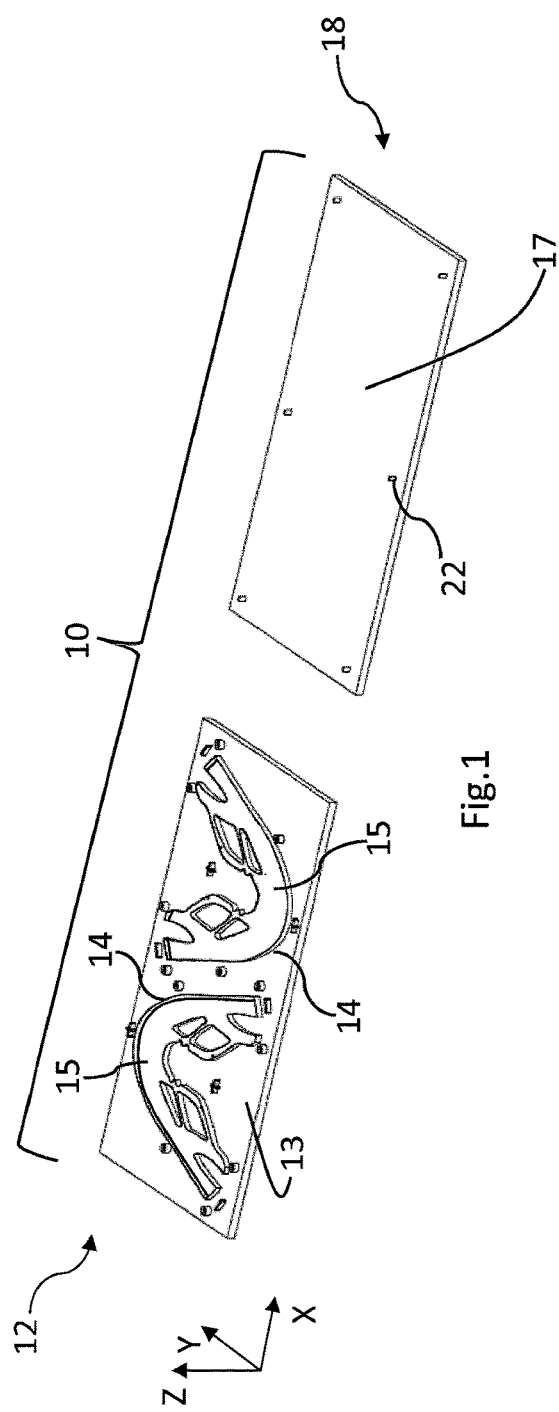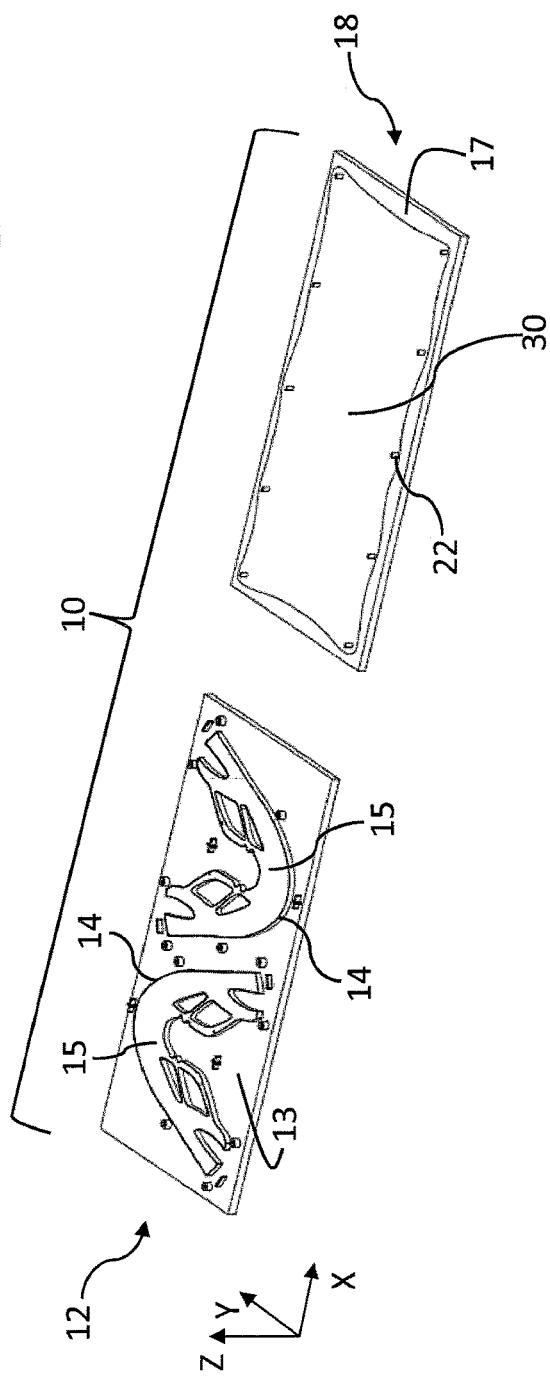

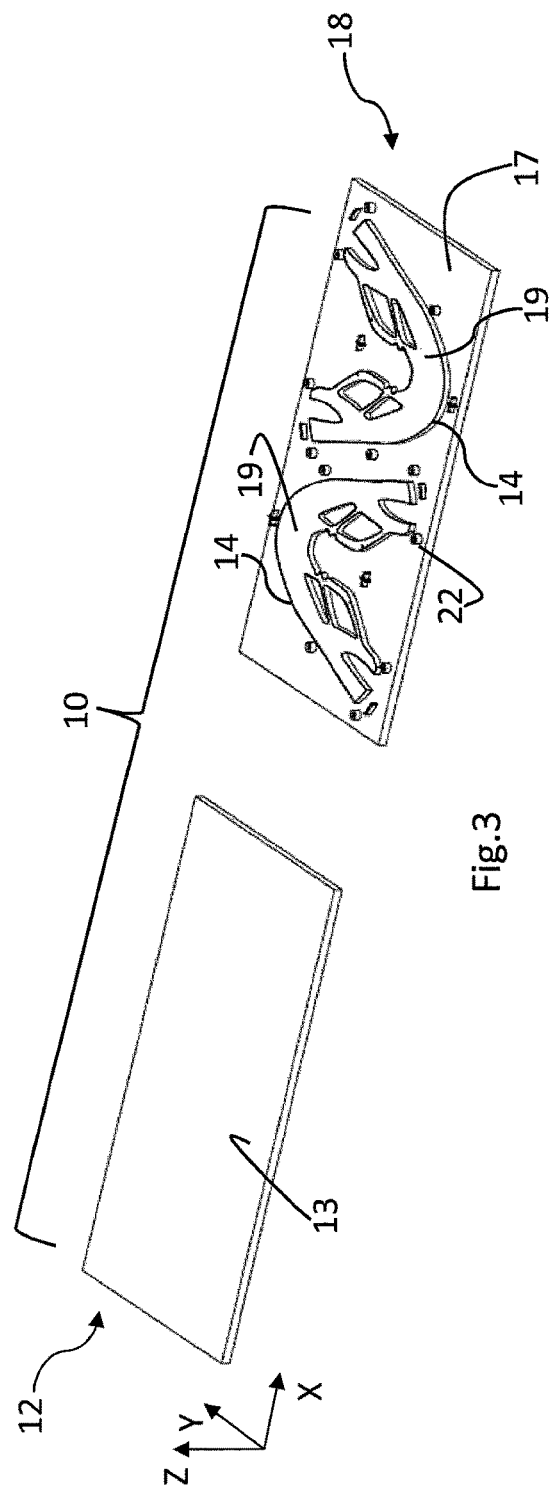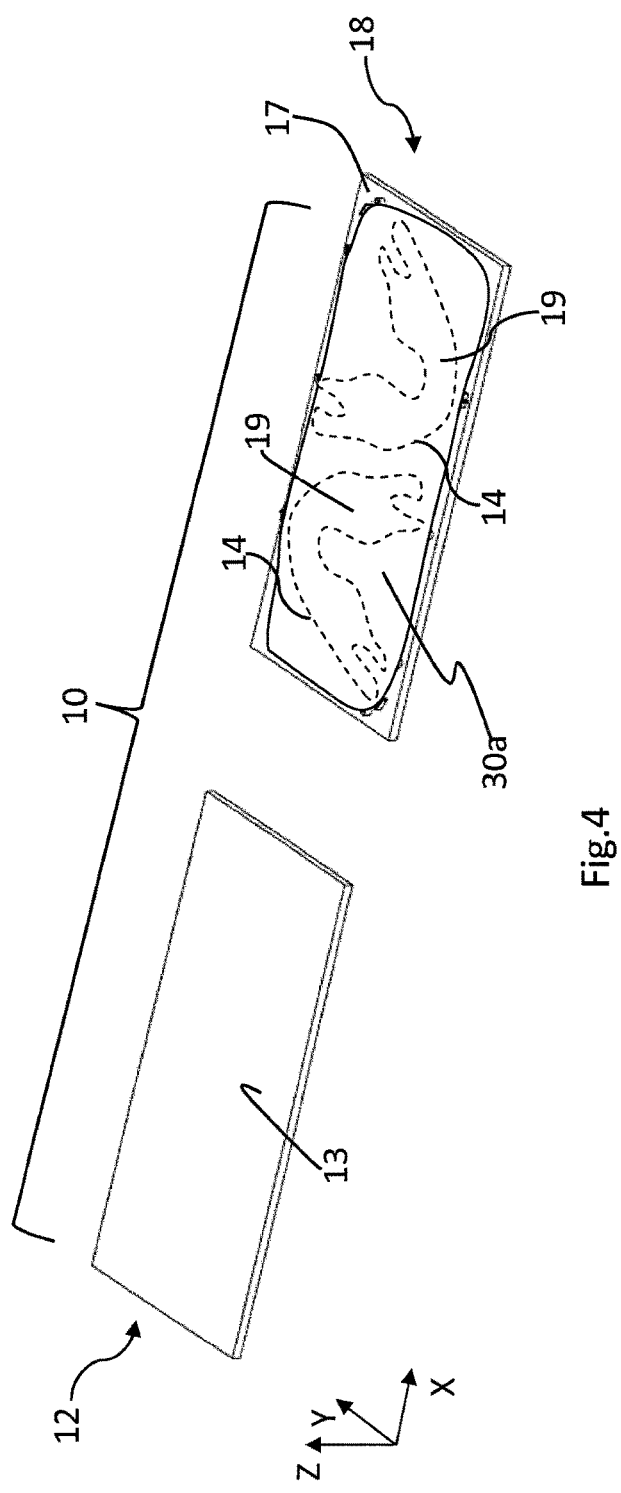

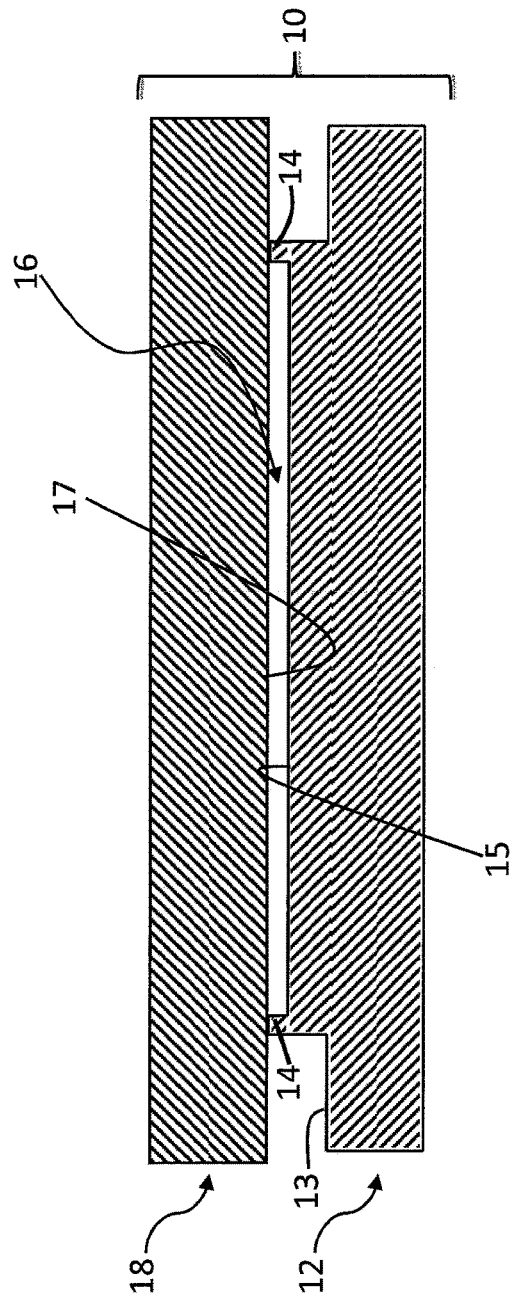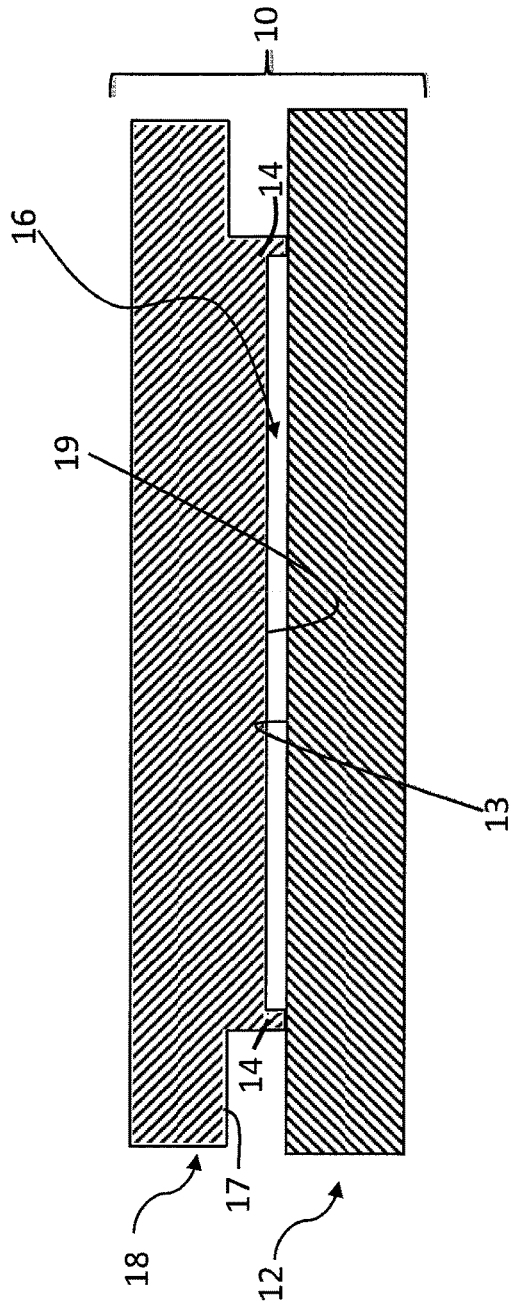

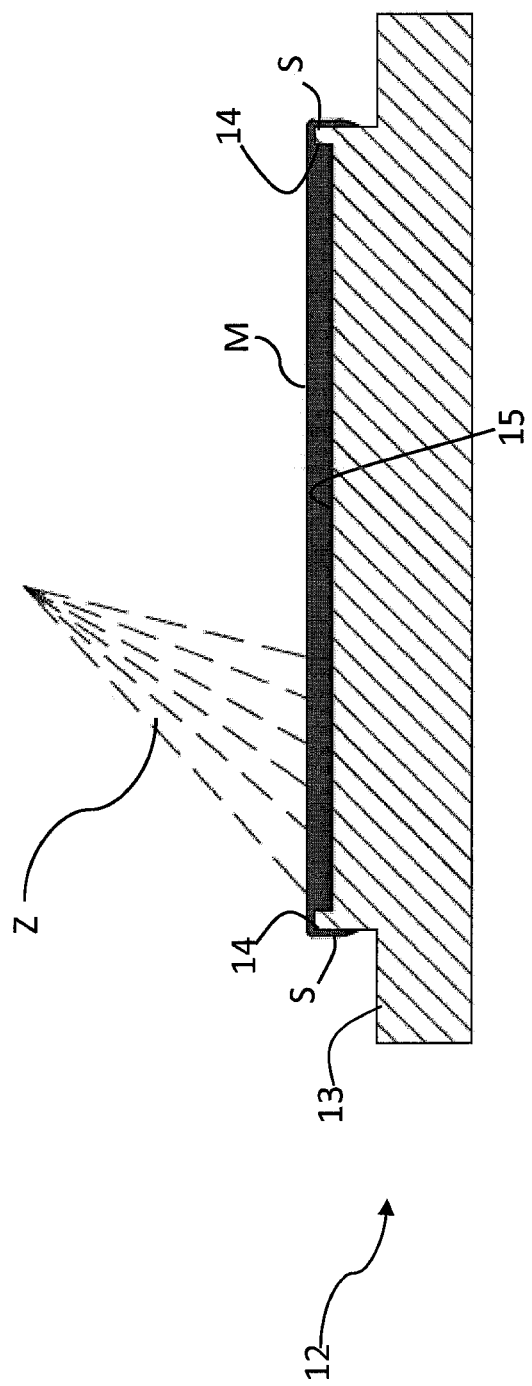

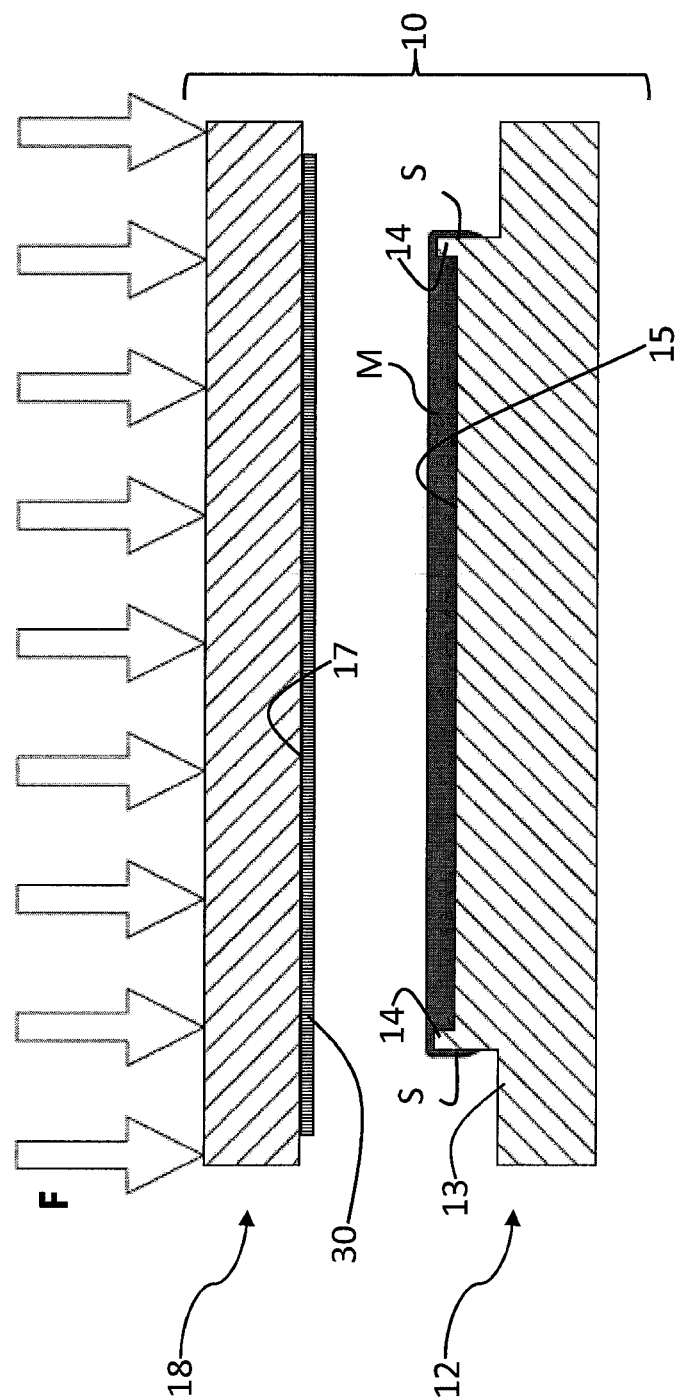

METHOD FOR APPLYING AN INSERT OF POLYMER MATERIAL ONTO A SUPPORT AND APPARATUS FOR IMPLEMENTING THIS METHOD

RELATED APPLICATIONS

This application is a 35 U.S.C. 371 national stage filing from International Application No. PCT/IB2013/051003 filed Feb. 7, 2013 and claims priority to Italian Application No. TV2012A000021 filed Feb. 10, 2012, the teachings of which are incorporated herein by reference.

The present invention relates to a method for applying an insert of polymer material onto a support.

The present invention also relates to the apparatus used for implementing this method.

Various methods for applying inserts and graphic designs onto support materials such as fabrics, paper, glass, ceramics, metal and wood are known.

The most widespread and widely used methods include silk-screen printing, injection or micro-injection moulding and high-frequency welding.

These application methods, however, although well-established, are not without drawbacks.

The silk-screen printing process, for example, requires that the support to be decorated should be perfectly flat, in order to prevent blotching of the ink.

Moreover, by means of the silk-screen printing method, it is possible to apply only designs or graphic patterns with a minimum thickness or in any case a thickness such as not to project, albeit by a minimum amount, from the base onto which they are applied.

One of the limits of injection or micro-injection moulding consists in the high cost of the moulds. Moreover, injection or micro-injection moulding, since it requires the use of moulding presses which are able to apply a high closing force and a suitable pressing force to the material to be injected, does not offer a high degree of operational flexibility.

It should also be noted that, at the point of separation between the single microinjections and the moulded part, a kind of impression remains on the surface of the moulded part, and this impression, although small in size, inevitably adversely affects the aesthetic properties of the article produced.

Moreover, these inserts, in a similar manner to that described with regard to the silk-screen printing method, are characterized by a small thickness.

Finally, the inserts which are made by means of high-frequency welding adhere perfectly to the support layer solely along their outer perimeter. There may in fact be inner portions which do not adhere perfectly to the support layer, creating a kind of air chamber between the support layer and the insert applied, with obvious problems of an aesthetic nature and also problems relating to tightness of the insert itself.

Also known from JP-A-6 000 826 is a method for applying an insert of polymer material onto a support layer. This method may not be used with inserts which have a mesh structure and require that the polymer material be distributed on the insert by means of a casting operation.

The object of the present invention is to overcome at least partly the drawbacks mentioned above with reference to the prior art.

In particular, a task of the present invention is to provide a method which can be easily implemented industrially for the application of an insert of polymer material onto a support layer.

Moreover, a further task of the present invention is to provide a method which allows a reduction in the processing time required for application of an insert of polymer material onto a support layer.

A further task of the present invention is to provide a method which can be used to obtain articles provided with an insert of polymer material which adheres perfectly to the support layer; this insert being without aesthetic defects and having a small thickness.

Furthermore, a task of the present invention is to provide a method which can be used to obtain articles provided with an insert of polymer material having optimum physical and mechanical properties, such as a high surface hardness, low abrasion, high elongation at break and high resilience.

Finally, a further task of the present invention is to provide an apparatus for applying an insert of polymer material onto a support layer, which is both low-cost and does not require the use of specialized labour.

This object and these tasks are achieved by means of a method for applying an insert of polymer material onto a support layer in accordance with claim 1 and an apparatus in accordance with claim 9.

In order to understand more fully the invention and appreciate its advantages, below a number of non-limiting examples of embodiment thereof are described with reference to the accompanying drawings in which:

FIG. 1 shows a schematic perspective view of a first embodiment of the apparatus according to invention;

FIG. 2 shows a schematic perspective view of the apparatus according to FIG. 1 during a first operating step;

FIG. 3 shows a schematic perspective view, similar to that of FIG. 1, of a second embodiment of the apparatus according to the invention;

FIG. 4 shows a schematic perspective view of the apparatus according to FIG. 3 during a first operating step;

FIG. 6 shows a schematic cross-sectional view of the apparatus shown in FIGS. 1 and 2 during a subsequent operating step;

FIG. 7 shows a schematic cross-sectional view, similar to that of FIG. 6, of the apparatus shown in FIGS. 3 and 4 during a subsequent operating step;

FIGS. 8 to 11 show schematically different operating steps of the method according to invention using the apparatus of FIG. 6;

Figure 5A:
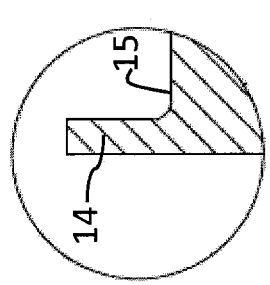
FIGS. 5a to 5e shows a corresponding number of views on a larger scale of the detail indicated by A of the component of FIG. 5.
Figure 5B:
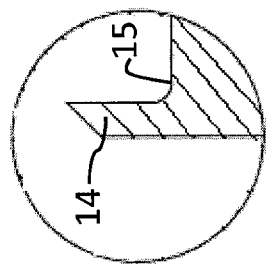
Figure 5C:
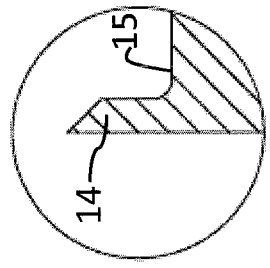
Figure 5D:
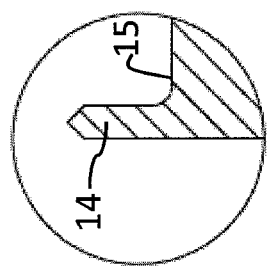
Figure 5E:
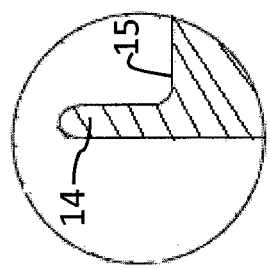
Figure 5:
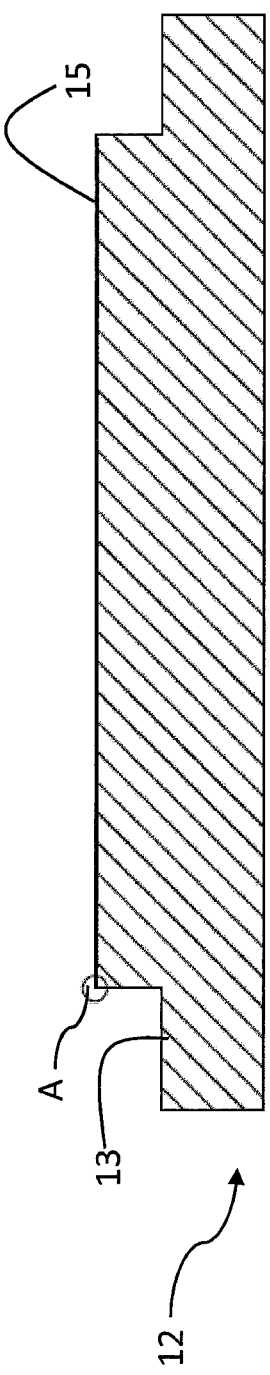
FIG. 5 shows a cross-sectional schematic view of a component of the apparatus shown in FIGS. 1 and 2.
Figure 10:
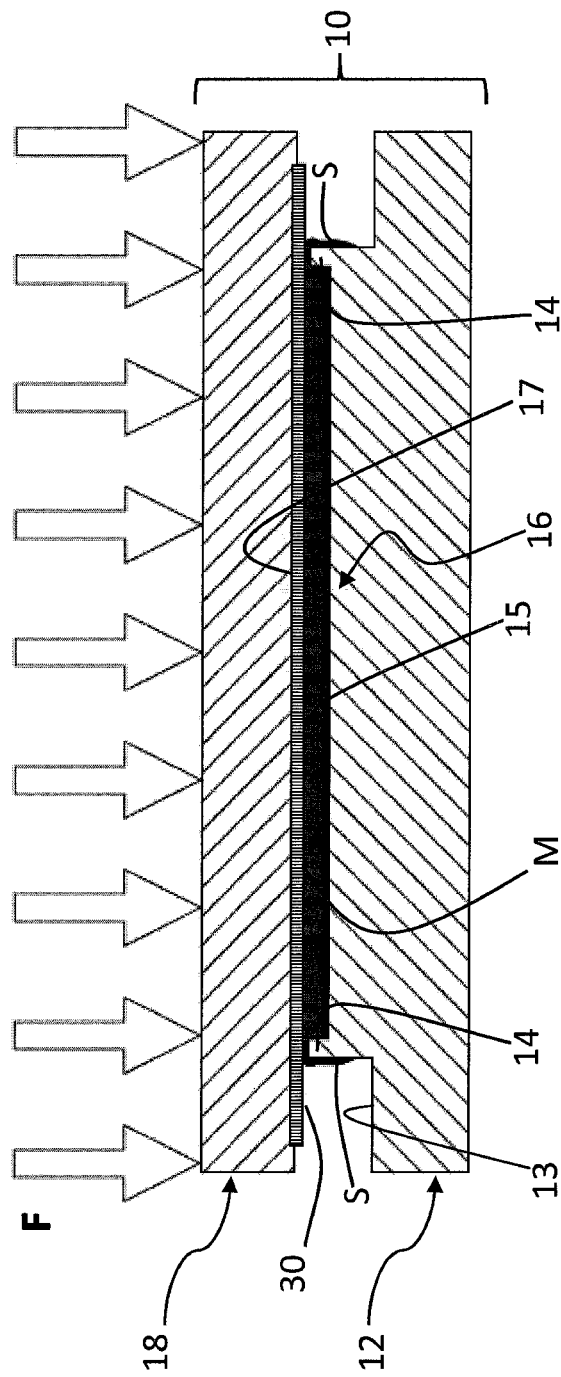

With reference to the accompanying figures, a mould suitable for being used to apply an insert 40 of polymer material onto a support layer 30, 30a is denoted overall by 10.

In the description below, for the sake of clarity, the reference number 30 is used to indicate a support layer having a continuous surface structure, i.e. one which is suitable for being impregnated, even only superficially, with the polymer material forming the insert 40, without being able to be passed through by it, while the reference number 30a indicates a support layer having a permeable surface structure, i.e. one which may be passed through by the polymer material from which the insert 40 is made.

The mould 10 comprises at least one base 12 and at least one cover 18.

The base 12 and the cover 18 are able to define, with two facing surfaces 13, 17, when the mould 10 is closed, a mould impression 16.

Said mould impression 16, which is perimetrally delimited by a closing edge 14, defines the volumes of the insert 40 which may be applied to the support layer 30, 30a. The surfaces of this mould impression 16 reproduce moreover the surface texture of the said insert 40.

The mould 10 also comprises fixing means 22 suitable for fixing the support layer 30, 30a to the cover 18 so that the support layer 30, 30a projects at least partially from the mould impression 16.

Preferably, the fixing means 22 are provided in the cover 18 of the mould 10. By means of these fixing means 22 the support layer 30, 30a may be fixed to the cover 18 of the mould 10.

In the description below the terms "top" and "bottom" will refer to a hypothetical support surface of the base 12 of the mould 10. In detail, "top" will indicate the part of the mould 10 or a component thereof which is situated relatively further from this support surface, while "bottom" will indicate the part of the mould 10 or a component thereof which is situated relatively closer to the support surface of the base 12.

With specific reference to the cover 18 of the mould 10, "top" will indicate the part of the cover 18 which, when the mould 10 is closed, is situated relatively further from the support surface of the base, while "bottom" will indicate the part of the cover 18 of the mould 10 which is located relatively closer to the support surface of the base 12.

In accordance with the embodiment of the mould 10 shown in FIGS. 1-2 and 6, the closing edge 14 may be provided on the top surface 13 of the base 12. As can be clearly seen in FIG. 6, the closing edge 14 may extend vertically from the top surface 13 of the base 12.

In accordance with the embodiment of the mould 10 shown in FIGS. 3-4 and 7, the closing edge 14 may be provided on the bottom surface 17 of the cover 18. As can be clearly seen in FIG. 7, the closing edge 14 may extend vertically from the bottom surface 17 of the cover 18.

In accordance with the embodiments of the mould 10 shown in FIGS. 1-2 and 6, "support surface 15" will indicate the portion of the top surface 13 of the base 12 which is delimited by the closing edge 14.

Similarly, in accordance with the embodiments shown in FIGS. 3-4 and 7, "abutment surface 19" will indicate the portion of the bottom surface 17 of the cover 18 which is delimited by the closing edge 14 provided on the cover 18.

In accordance with that described above and that shown in detail in FIG. 6, in a first embodiment of the mould 10, the mould impression 16 is therefore delimited perimetrally by the closing edge 14, at the bottom by the supporting surface 15 of the base 12 and at the top by the bottom surface 17 of the cover 18.

In a second embodiment of the mould 10, shown in detail in FIG. 7, the mould impression 16 is delimited perimetrally by the closing edge 14, at the bottom by the top surface 13 of the base 12 and at the top by the abutment surface 19 of the cover 18.

In the figures of the present patent application, both the support surface 15 and the abutment surface 19 of the mould 10, for the sake simplicity, are schematically shown as flat surfaces but, as will become clear to a person skilled in the art from the description below, these surfaces may have an undulating or curved form.

In accordance with that shown in FIGS. 5a-5e, the mould 10 according to the invention may have various embodiments of the closing edge 14, both in the case where this closing edge 14 is provided in the base 12 and in the case where the closing edge is provided in the cover 18.

The closing edge 14 as already mentioned perimetrally delimits the mould impression 16. Moreover, as will be described in detail below, the closing edge 14, when the mould 10 is closed, perimetrally compresses the support layer 30, 30a against the bottom surface 17 of the cover 18 (see in detail FIG. 11) or against the top surface 13 of the base 12 (see in detail FIG. 16), so as to ensure tightness of the mould impression 16.

In this way, in fact, it is ensured that the polymerization reaction of the mixture sprayed either onto the base 12 or onto the cover 18 does not occur outside of the mould impression 16.

In accordance with the embodiments shown in FIGS. 5 and 5a-5e, in which for the sake of clarity, reference will be made to a closing edge 14 provided on the base 12, the end of the closing edge 14 may have a flat shape (FIG. 5a), wedge shape, having different inclinations of the top edge (FIGS. 5b, 5c, 5d), or semi-spherical shape (5e).

The particular configuration of the closing edge 14 is such that it is possible to ensure tightness, when the mould 10 is closed, of the mould impression 16 and on the other hand not damage the support layer 30, 30a onto which the insert 40 must be applied.

Moreover, as will be explained in detail below, the article 20 obtained following application of the insert 40 onto the support layer 30, 30a, at the end of the various operating steps, has moulding burrs.

Advantageously, the particular configuration of closing edge 14 facilitates removal of this moulding burr. In fact, along this closing edge 14, a discontinuous zone is created between the mixture polymerized inside the mould impression 16 and the mixture S which has flowed outside the mould impression 16.

This discontinuous zone, which has a fairly small thickness, of the order of a few tenths of a millimetre, allows easy separation of the moulding burrs from the finished polymer insert 40, without negatively affecting the aesthetic appearance of the latter.

The closing edge 14 may be formed by means of sheet-metal element inserted inside a special groove provided either on the cover or on the base.

Alternatively, the closing edge 14 may be obtained by means of suitable mechanical machining of the top surface 13 of the base 12 or the bottom surface 17 of the cover 18.

Similar considerations are applicable in the case where the closing edge 15 is provided on the cover 18 of the mould 10.

As already mentioned above, the invention relates to an innovative method for applying an insert 40 of polymer material onto a support layer 30, 30a.

In detail the method according to the present invention envisages the following steps:

preparing a mould 10 comprising at least one base 12 and a cover 18; the base 12 and the cover 18 being suitable for defining with facing surfaces 13, 17, when the mould 10 is closed, a mould impression 16 delimited perimetrally by a closing edge 14 which extends vertically from one of the facing surfaces 13, 17 of the mould 10; the mould impression 16 defining the volumes and the surface texture of the insert 40 which must be applied to the support layer 30, 30a;

spraying a polymer mixture (M) in the fluid state onto at least one of the facing surfaces 13, 17 of the mould 10;

introducing a support layer 30, 30a between base 12 and cover 18 of the mould 10 so that, when the mould 10 is closed, the support layer 30, 30a projects at least partially from the closing edge 14;

and after that pressing the cover 18 of the mould 10 onto the base 12 of the mould so as to:

define the mould impression 16;

perimetrally compress the support layer 30, 30a by means of the closing edge 14 against one of the facing surfaces 13, 17 of the mould 10;

compress the polymer mixture M present inside the mould impression 16; and allow adhesion of the polymer mixture M present inside the mould impression 16;

opening the mould 10 in order to remove the support layer 30, 30a and the associated insert 40;

trimming a portion S of the polymer mixture M which, following the spraying and pressing steps, has flowed outside the external perimeter of the mould impression 16.

In the description of the method which follows reference will be made firstly to a support layer 30 having a continuous surface structure.

This support layer 30 may be chosen from a vast range of materials, such as: leather, synthetic fabric, glass, ceramic, metals or non-woven fabric. In the case of materials such as glass, ceramic or metals the continuous surface structure of these materials may have micro-incisions or protuberances such as to allow the polymer material to adhere to the support layer.

During the description of the individual steps of the method according to the invention the step relating to preparation of the mould 10 is not included, since a mould 10 with these characteristic features has been described in full above.

With reference to the step of spraying the polymer mixture M, in the context of the present description, spraying is understood as meaning propelling liquid mixtures which are in the form of a nebulized spray (atomized).

The sprayed polymer mixture M has micro-particles, these particles being conveyed inside an air flow.

The step for spraying of the polymer mixture M is performed using known spraying devices (not shown in the accompanying figures).

Advantageously it is possible to use the spraying device described in Italian patent IT 1391488 in the name of the same Applicant, which may be used to spray very small flow rates of a mixture comprising a reactive polymer material, such as dual-component or multi-component polyurethane or a multi-component polyurethane resin.

These materials typically have a satisfactory degree of fluidity and are able to polymerize relatively rapidly.

Pressing of the cover 18 of the mould 10 onto the base 12, together with provision of the closing edge 14, also allows polymerization of the sprayed polymer mixture M to be performed in a controlled manner, inside the impression of the mould 16.

Polymerization of the sprayed polymer mixture M which is performed inside the mould 10 will not be described in further detail below, since it is well known to the person skilled in the art.

It is also known to a person skilled in the art that the polymerization reaction of a mixture may be accelerated if suitable catalysers are added to the basic components of the mixture or if the mould is suitably heated.

Advantageously the polymer mixture M may be sufficiently viscous to allow spreading thereof on the surface of the mould onto which it is sprayed.

Said polymer mixture M, in this case, may have slower polymerization times.

The polymer mixture M in the liquid state may be sprayed onto at least one of the facing surfaces 13, 17 of the mould 10. Said polymer mixture may therefore be sprayed equally well either onto the base 12 of the mould 10 or onto the cover 18 of the mould 10. Preferably the polymer mixture 10 is sprayed onto the base 12 of the mould.

FIG. 8 illustrates schematically spraying of the polymer mixture M onto the base 12 of the mould 10, Z indicating the spray cone of the mixture M produced by the spraying device.

It may be noted how spraying of the polymer mixture M may be performed not only within the perimeter delimited by the closing edge 14, but also on a portion of the top surface 13 of the base 12 outside the closing edge 14.

In such a case the final appearance of the product 20 obtained by means of the method according to the invention is not adversely affected and the spraying step may be performed more rapidly, since a high degree of precision is not required.

Moreover, on the basis of that indicated above, the spraying device may be advantageously operated manually, not requiring the use of specialized labour and the use of specific spraying plants.

According to a variant of the production method according to the present invention, following spraying of the polymer mixture M, spreading of the polymer mixture M over the surface onto which it has been sprayed may be performed using a doctor blade (not shown in the accompanying figures since well known to the person skilled in the art).

In this way it is possible to obtain uniform distribution of the polymer mixture M sprayed onto one of the two facing surfaces of the mould 10.

Moreover, in a simple manner, it is possible to remove any excess quantities of polymer mixture which may have been inadvertently sprayed.

The introduction of a step for spreading the polymer mixture M advantageously facilitates trimming of any excess burr.

In fact, pressing of the cover 18 onto the base 12 of the mould 10 results in a smaller amount of material which flows outside the mould impression 16.

As already mentioned, spraying of the polymer mixture M in the liquid state is followed by introduction of the support layer 30 between the base 12 and the cover 18 of the mould 10, so that the support layer 30 projects at least partly from the closing edge 14 which delimits perimetrally the mould impression 16.

By means of suitable fixing means, which are provided in the mould 10, the support layer 30 may be fixed either to the base 12 of the mould 10 or to the cover 18 of the mould 10.

Preferably the support layer 30 is fixed onto one of the two facing surfaces 3, 17 of the mould 10 which define the mould impression 16. In particular, the support layer 30 is preferably fixed onto the facing surface of the mould onto which the polymer mixture M has not been sprayed beforehand.

With reference to the embodiment shown in the accompanying figures, the support layer 30 is fixed, in a known manner, to the cover 18 of the mould 10 by means of the fixing means 22.

As already mentioned, in order to perform correct filling of the mould impression 16 and ensure that the polymer material insert 40 may adhere to the support layer 30, the support layer 30 must project at least partly from the closing edge 14.

Figure 11:
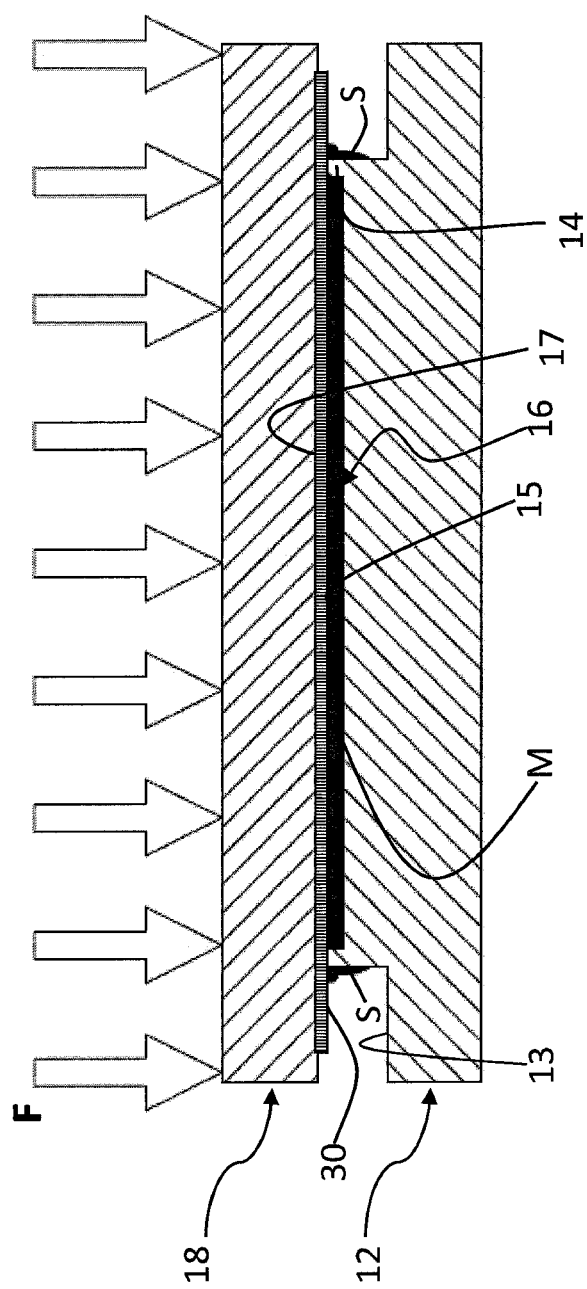
Figure 12:
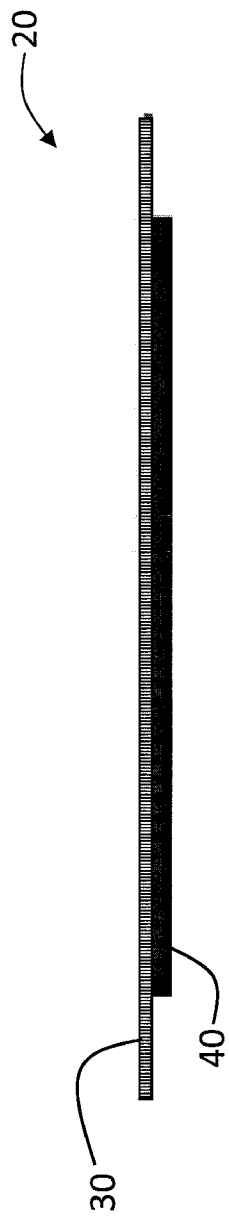
FIG. 12 shows a schematic cross-sectional view of an article obtained with the method schematically illustrated in FIGS. 8 to 11.
Figure 13:
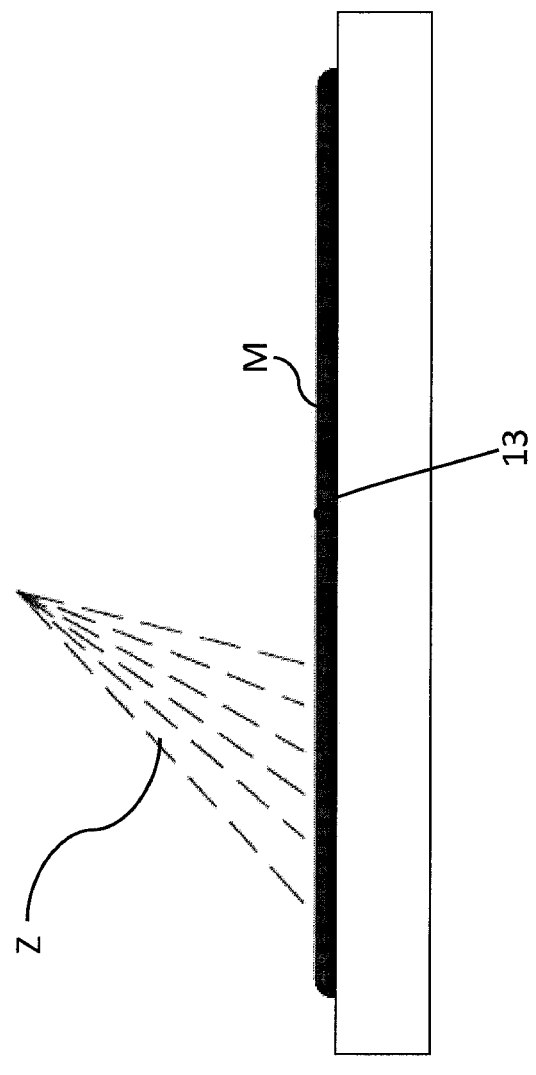
FIGS. 13 to 16 show schematically different operating steps of the method according to the invention using the apparatus of FIG. 7.

On the basis of that described above, it should be noted therefore how, when the mould 10 is closed, i.e. when the cover 18 is placed against the base 12, the support layer 30, along the perimeter of the mould impression 16, may be clamped between the closing edge 14, provided on the base 12 of the mould, and the bottom surface 17 of the cover 18 (see FIG. 11).

At the end of the step for introducing the support layer 30 between the base 12 and the cover 18 of the mould 10, pressing of the cover 18 onto the base 12 of the mould 10 is performed.

This pressing step requires the application of a pressing force F onto the top surface of the cover 19.

It is sufficient therefore to ensure that the closing edge 14 of the mould 10 exerts a pressure on the support layer 30 introduced between the base 12 and the cover 18.

The pressing step, on the basis of that stated above, may be advantageously performed using a hydraulic press (not shown in the accompanying figures).

The base 12 of the mould 12 may be advantageously placed on the fixed surface of the press, while the cover 18, after being rested on the base 12, may be pressed by the hydraulic piston of the press against the base 12.

Bringing the cover 18 into contact with the base 12 of the mould 10 defines the mould impression 16 and ensures tightness thereof.

Moreover, by pressing the cover 18 onto the base 12, it is possible to compress, between base 12 and cover 18, the previously sprayed mixture M, allowing the mixture polymerization reaction to take place and develop in a controlled manner.

In this way there is perfect adhesion of the polymer mixture M to the support layer 30. Moreover, the polymer mixture M, compressed inside the mould impression 16, is able to reproduce perfectly the surface texture present on the surfaces which delimit the mould impression 16, ensuring that the finished product 20 has an excellent appearance.

The step of pressing the cover 18 onto the base 12 may last a few minutes, preferably between 3 and 5 minutes, depending on the polymer mixture used and dimensions of the insert 40 to be applied to the support layer 30.

Then, after raising the press piston, the mould 10 is opened, separating the cover 18 from the base 12, in order to remove the support layer 30 provided with associated insert 40 from the mould.

The article 20 may be extracted from the mould manually or using special hooks.

Before the following spraying step, cleaning of both the base 12 and the cover 18 of the mould 10 may be performed, making use of special brushes or tools. Moreover, separating agents may be sprayed onto the inner surfaces of the base 12 and the cover 18 of the mould 10 so as to facilitate subsequent removal of the article 20 from inside the mould 10.

The article 20, once extracted from the mould 10, has, as already mentioned, casting burrs. These burrs are due to the fact that a portion S of the sprayed polymer mixture M, following both the spraying step and the subsequent pressing step, may flow outside of the perimeter defined by the closing edge 14.

This is however advantageous for ensuring correct filling of the mould impression 16 and firm adhesion of the insert 40 to the support layer 30.

The casting burrs may be easily removed from the article 20. The portion S of polymer mixture M, in fact, since it is not pressed inside the mould impression 16, does not adhere to the support layer 30. Moreover, the specific shape of the closing edge 14 (see FIGS. 5a-5e), once the support layer 30 is pressed between the base 12 and the cover 18 of the mould 10, is such that the joint between the casting burrs and the insert 20 has a small thickness of about 1-2 tenths of a millimetre.

Separation of the burrs from the outer perimeter of the insert 40 is consequently facilitated and is performed without adversely affecting the aesthetic appearance of the article produced.

The perimetral edges of the insert 40 will reproduce exactly the perimeter defined by the closing edge 14 of the mould 10, not having any lipped portions or protrusions.

This trimming operation may be advantageously performed manually and does not necessarily require the use of suitable semi-automatic trimming machines.

The method according to the invention may be advantageously used also in the case where the support layer 30a may be permeated by the sprayed polymer mixture M (see FIGS. 14-17).

Said support layer 30a may have a wide-mesh, for example reticular, structure or may have a plurality of transverse through-holes. Advantageously said support layer 30a may be chosen from the group of materials comprising natural fibres, such as jute, bamboo, linen or straw.

In the case where the insert of polymer material must be applied to a support layer of this type, the steps of the method described above are still valid and may be performed in the same sequence.

Preferably the embodiment of the mould 10 shown in FIGS. 3-4 and 7 is used, where, as described above, the closing edge 14 is provided in the cover 18.

In this embodiment the polymer mixture M is sprayed onto the top surface 13 of the base 12 and the support layer 30a is fixed onto the cover 18 so that the support layer 30a projects at least partially from the closing edge 14.

In the case also where the support layer has a wide-mesh structure, the spraying step may be followed by a step for spreading the sprayed polymer mixture, using a doctor blade.

In this way, as already described, it is possible to distribute uniformly the mixture M over the surface onto which it has been sprayed, removing any excess amounts of mixture which have been sprayed.

Figure 14:
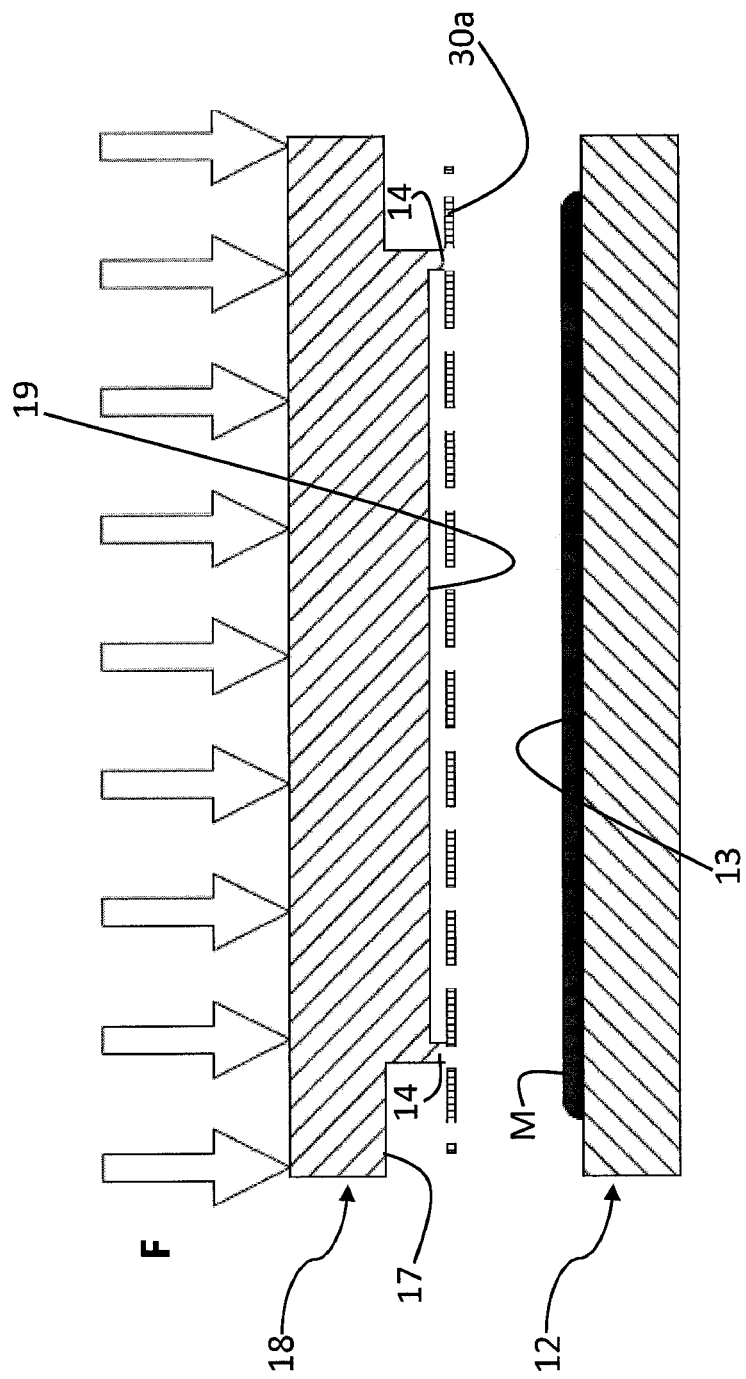
Figure 15:
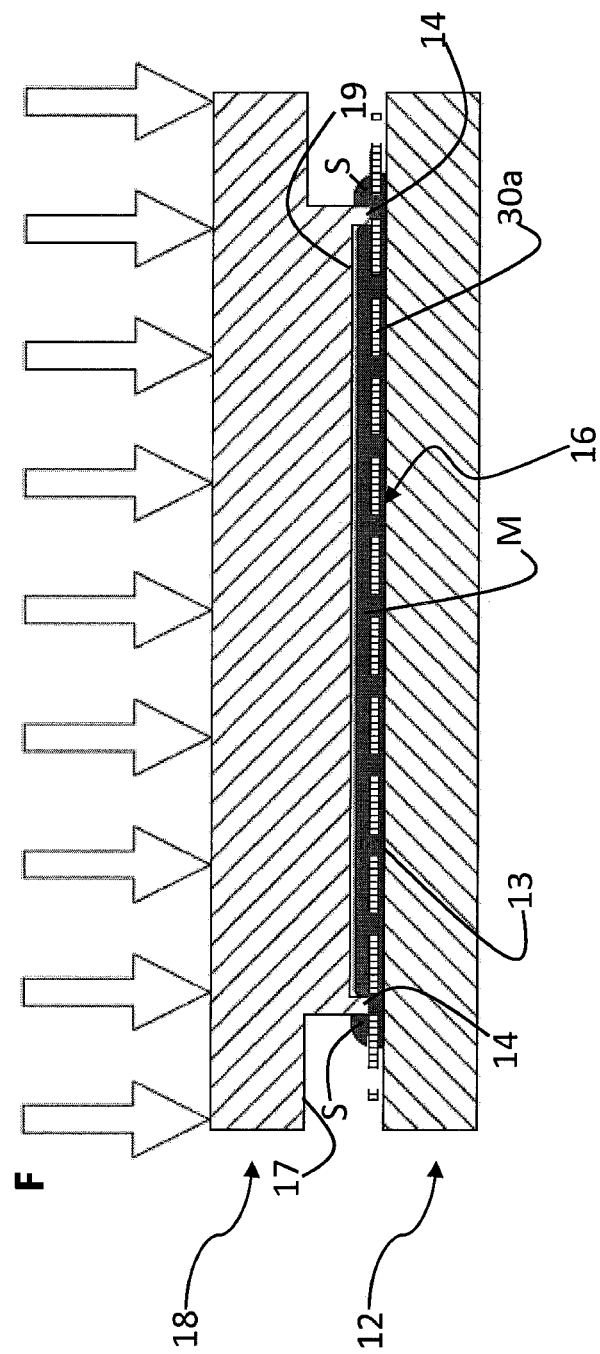

In a manner similar to that described above, the cover 18 onto which the support layer 30a has been fixed is positioned on the base and is then pressed against the base 12 of the mould 10, thus defining the mould impression 16 (see FIGS. 14-15).

Figure 16:
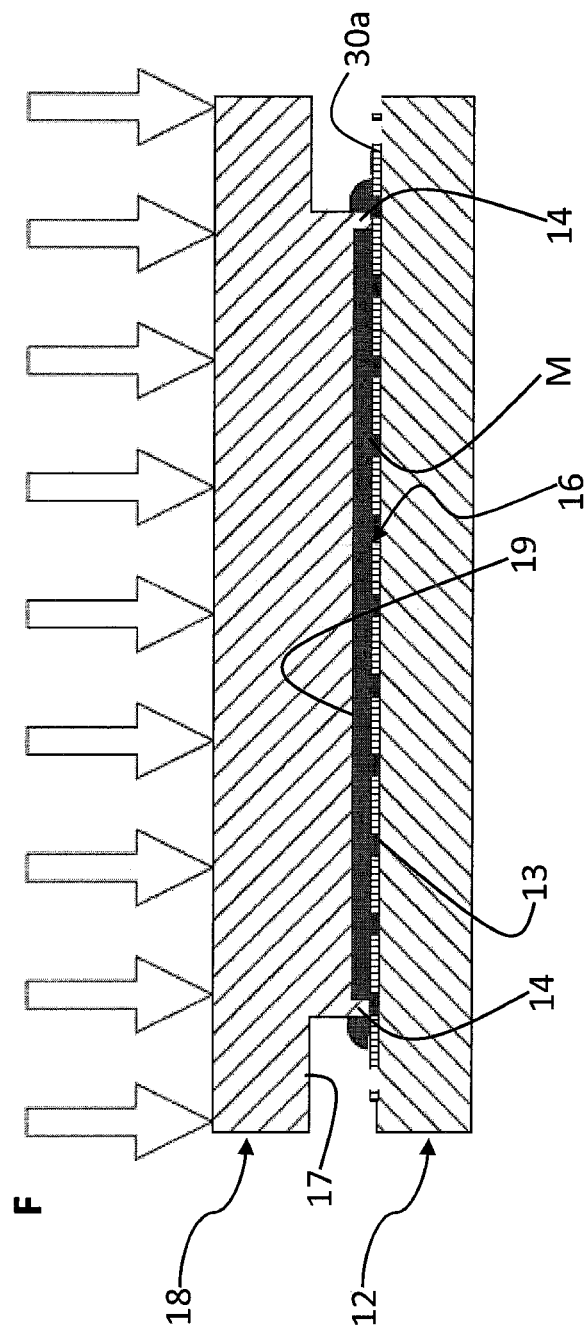
Figure 17:
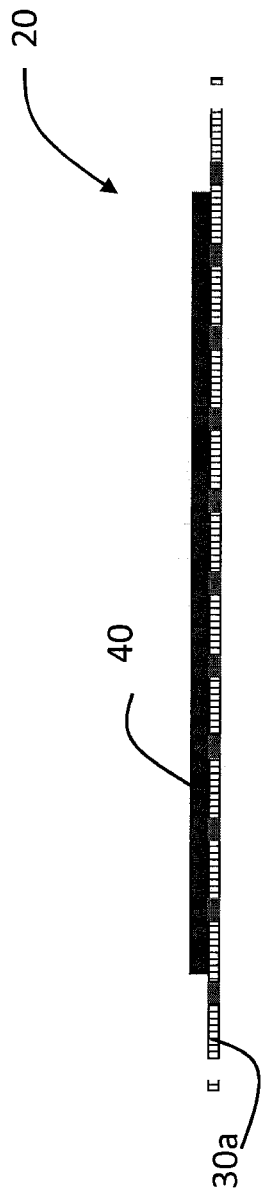
FIG. 17 shows a cross-sectional schematic view of an article obtained with the method schematically shown in FIGS. 13 to 16.

The support layer 30a, along the perimeter of the mould impression 16, is clamped between the closing edge 14, provided on the cover 18 of the mould 10, and the top surface 13 of the base 12 (see FIG. 16).

As schematically shown in FIG. 15, the particular structure of the support layer 30a is such that, following the pressure exerted by the cover, the polymer mixture M, which has been sprayed beforehand onto the top surface 13 of the base 12, is able to flow through the structure of the support layer 30a and occupy entirely the volume defined by the mould impression 16.

The polymerization reaction takes places in a manner similar to that described above. It should be noted, in fact, how the pressure of the cover 18 on the base 12 of the mould allows the polymer mixture M, once it has flowed through the support layer 30a, to reproduce perfectly any surface texture provided on the abutment surface 19 of the cover.

After the mould 10 has been opened, it is required to trim, in a manner similar to that described above, the casting burrs resulting from the portion S of polymer mixture M which, following the preceding processing steps, has flowed outside the closing edge 14 provided on the cover 18 of the mould 10 (see FIGS. 15-16).

Also in the case of a support layer 30a which may be permeated by the polymer mixture M, trimming of these casting burrs is an easy operation.

As already explained above, in fact, the specific shape of the closing edge 14 and the lack of pressure of the portion S of the polymer mixture M inside the mould impression 16 prevent the casting burrs from adhering to the support layer 30a.

In this case, also, therefore, the trimming operation may be performed manually without requiring the use of semi-automatic trimming machines.

The perimetral edges of the insert 40 will reproduce exactly the perimeter defined by the closing edge 14 of the mould 10, without any lipped portions or protuberances.

In the light of the above, the person skilled in the art will easily understand how the method and the apparatus according to the invention are able to overcome the drawbacks mentioned with reference to the prior art.

In particular, the method according to the invention may be easily implemented on an industrial level, allowing inserts of polymer material to be applied onto different support layers without the need to use equipment which is costly or requires the use of specialized labour.

Moreover, with the method and the apparatus according to the invention, it is possible to obtain articles 20 in which the polymer insert 40 adheres perfectly along its entire surface, and not only along its external perimeter, to the support layer 30, 30a, reducing the risk that the insert 40 may become detached from the support layer 30, 30a, once the article is being used.

Finally, with the method and the apparatus according to the invention, it is possible to obtain articles 20 provided with inserts 40 having a thickness of not insignificant size compared to the size of the support layer.

Also, with the method and the apparatus according to the invention, it is possible to use a single mould for applying polymer inserts both on inserts which have a continuous surface structure and which may therefore be impregnated, albeit superficially, with the sprayed polymer mixture without being passed through by it, and on inserts which are permeable, i.e. which may be passed through by the sprayed polymer mixture. It is sufficient, in fact, to interchange base and the cover of the mould in order to obtain mould impressions 16 which may be used both with inserts which have a continuous surface structure and with inserts which are permeable in relation to the sprayed mixture. As shown in the accompanying figures, the surface having impressed therein the surface texture which must be reproduced on the insert is always provided in the portion of the mould enclosed by the closing edge 14.

The embodiments of the method and apparatus described above may, in order to meet specific requirements, be subject to modification and/or the replacement of parts described with equivalent parts by the person skilled in the art, without thereby departing from the scope of the accompanying claims; for example, cover and base may be interchanged.

The invention claimed is:

1. A method for applying by imprinting or patterning an insert of polymer material onto a support layer with a continuous surface structure or a surface structure which is suitable for being permeated by the polymer material, the method comprising the following steps conducted in same order as follows:
   (a) providing a mould comprising at least one base and at least one cover; the at least one base and the at least one cover being suitable for defining with facing surfaces, when the mould is closed, a mould impression which is delimited perimetrically by a closing edge which extends vertically from one of the facing surfaces of the mould, the mould impression defining a volume and a surface texture of the insert of the polymer material to be applied to the support layer;
   (b) spraying a polymer mixture in a fluid state onto at least one of said facing surfaces of the mould when the mould is open and prior to introduction of the support layer between the at least one base and at least one cover of the mould, the polymer mixture comprising micro-particles conveyed inside an air flow via the spraying;
   (c) introducing the support layer between the at least one base and the at least one cover of the mould so that, when the mould is closed, the support layer projects at least partially from the closing edge of the mould impression;
   (d) pressing the cover of the mould onto the base of the mould so as to:
      (i) define the mould impression;
      (ii) perimetrically compress the support layer by means of the closing edge of the mould impression against one of the facing surfaces of the mould;
      (iii) compress the polymer mixture present inside the mould impression; and
      (iv) allow adhesion of the polymer mixture to the support layer;
   (e) opening the mould in order to remove the support layer and the polymer mixture; and
   (f) trimming a portion of the polymer mixture which, following the spraying and pressing steps, has flowed outside a perimeter defined by the closing edge of the mould impression.

2. The method of claim 1, wherein the polymer mixture comprises a reactive polymer material.

3. The method of claim 2, wherein the reactive polymer is a dual-component polyurethane or a multi-component polyurethane, or a multi-component polyurethane resin.

4. The method of claim 1, wherein the support layer is comprised with the continuous surface structure is selected from a group of materials comprising one of leather, synthetic fabric, glass, ceramics, metals and non-woven fabric.

5. The method of claim 1, wherein the support layer is comprised with the surface structure, the support layer suitable for being permeated by the polymer mixture and having one of a reticular structure or a plurality of transverse through-holes and being selected from a group of materials comprising natural fibres.

6. The method of claim 5, wherein the natural fibres comprise one of jute, bamboo, linen, or straw.

7. The method of claim 1, wherein the support layer is fixed to the at least one cover by fixing means.

8. The method of claim 1, wherein the polymer mixture is sprayed onto the at least one base of the mould.

9. The method of claim 1, wherein the polymer mixture when sprayed is uniformly distributed by means of a doctor blade over a surface of the mould.

10. The method of claim 1, wherein the step of pressing the at least one cover of the mould onto the at least one base of the mould, together with the closing edge of the mould impression, allows a polymerization reaction of the polymer mixture when sprayed onto at least one of the facing surfaces of the mould inside the mould impression.

11. The method of claim 1, wherein the support layer is fixed to the cover in introducing the support layer between the at least one cover and the at least one base of the mould.

12. A mould suitable for being used for applying an insert of polymer material onto a support layer having a continuous surface structure or a surface structure which may be permeated by the polymer material, said mould configured to use the method according to claim 1, said mould comprising:

at least one base and a cover, said base and said cover being suitable for defining, with the facing surfaces when the mould is closed;

a mould impression which defines the volume of the insert, the surface of said impression reproducing the surface texture of the insert;

fixing means for positioning the support layer in the mould so that, when the mould is closed, the support layer projects at least partially from the mould impression;

said mould impression being delimited perimetrically by a closing edge which extends vertically from one of the facing surfaces of the mould, said closing edge being designed, when the mould is closed, to compress perimetrically the support layer.

13. The mould of claim 12, wherein one end of the closing edge has a flat shape or wedge shape or semi-spherical shape.

14. The mould of claim 12, wherein the closing edge is formed by means of a sheet-metal element inserted inside a groove provided in the base or in the cover of the mould.

15. The mould of claim 12, wherein the closing edge is formed by means of mechanical machining of one of the facing surfaces of the mould.

* * * * *